(12) United States Patent
Kaji et al.

(10) Patent No.: US 10,787,369 B2
(45) Date of Patent: Sep. 29, 2020

(54) TITANIUM OXIDE FINE PARTICLES AND METHOD FOR PRODUCING SAME

(71) Applicant: ISHIHARA SANGYO KAISHA, LTD., Osaka-shi, Osaka (JP)

(72) Inventors: Seiji Kaji, Osaka (JP); Hironori Shimoita, Osaka (JP); Yurie Omori, Osaka (JP)

(73) Assignee: ISHIHARA SANGYO KAISHA, LTD., Osaka-Shi, Osaka (JP)

( * ) Notice: Subject to any disclaimer, the term of this patent is extended or adjusted under 35 U.S.C. 154(b) by 4 days.

(21) Appl. No.: 15/323,248

(22) PCT Filed: Jun. 30, 2015

(86) PCT No.: PCT/JP2015/068781
§ 371 (c)(1),
(2) Date: Dec. 30, 2016

(87) PCT Pub. No.: WO2016/002755
PCT Pub. Date: Jan. 7, 2016

(65) Prior Publication Data
US 2017/0137301 A1 May 18, 2017

(30) Foreign Application Priority Data
Jul. 2, 2014 (JP) .................. 2014-136810

(51) Int. Cl.
*C01G 23/053* (2006.01)
*C01G 23/04* (2006.01)
(Continued)

(52) U.S. Cl.
CPC .......... *C01G 23/0536* (2013.01); *B01J 20/06* (2013.01); *B01J 20/28004* (2013.01);
(Continued)

(58) Field of Classification Search
CPC . C01G 23/0536; B01J 20/06; B01J 20/28004; B01J 20/28007; B01J 20/28057;
(Continued)

(56) References Cited

U.S. PATENT DOCUMENTS 3,528,773 A 9/1970 Surls
5,149,519 A 9/1992 Chopin
(Continued)

FOREIGN PATENT DOCUMENTS

EP 0376216 7/1990
EP 0 581 216 2/1994
(Continued)

OTHER PUBLICATIONS

European Office Action and Partial European Search Report issued in corresponding European Patent Application No. 15814239.8, based on PCT/JP2015068781, dated May 25, 2018, pp. 1-15.
(Continued)

*Primary Examiner* — James A Fiorito
(74) *Attorney, Agent, or Firm* — Jeffrey S. Melcher; Melcher Patent Law PLLC

(57) ABSTRACT

Provided are: titanium oxide fine particles having small primary particle diameters and small agglomerated particle diameters; and a method for producing titanium oxide fine particles. The BET diameters of the titanium oxide fine particles are 1-50 nm; the agglomerated particle diameters thereof are 1-200 nm; and the (agglomerated particle diameter)/(BET diameter) ratio is 1-40. Titanium (oxy)chloride is hydrolyzed in an aqueous solvent, while controlling the pH range and the temperature range. Preferably, titanium (oxy) chloride is subjected to a primary hydrolysis in an aqueous solvent, and a secondary hydrolysis is subsequently carried out, while adding titanium (oxy)chloride thereto.

23 Claims, 8 Drawing Sheets

(51) Int. Cl.
*B01J 20/06* (2006.01)
*B01J 20/28* (2006.01)
*B01J 20/30* (2006.01)
*B01J 21/06* (2006.01)
*B01J 35/00* (2006.01)
*B01J 35/02* (2006.01)
*B01J 35/10* (2006.01)
*B01J 37/00* (2006.01)

(52) U.S. Cl.
CPC ..... *B01J 20/28007* (2013.01); *B01J 20/2808* (2013.01); *B01J 20/28057* (2013.01); *B01J 20/28071* (2013.01); *B01J 20/28073* (2013.01); *B01J 20/28083* (2013.01); *B01J 20/28085* (2013.01); *B01J 20/3085* (2013.01); *B01J 21/063* (2013.01); *B01J 35/004* (2013.01); *B01J 35/0013* (2013.01); *B01J 35/026* (2013.01); *B01J 35/1004* (2013.01); *B01J 35/1038* (2013.01); *B01J 35/1042* (2013.01); *B01J 35/1057* (2013.01); *B01J 35/1061* (2013.01); *B01J 35/1066* (2013.01); *B01J 37/0072* (2013.01); *C01G 23/04* (2013.01); *C01P 2004/03* (2013.01); *C01P 2004/62* (2013.01); *C01P 2004/64* (2013.01); *C01P 2006/12* (2013.01); *C01P 2006/14* (2013.01); *C01P 2006/16* (2013.01)

(58) Field of Classification Search
CPC .......... B01J 20/28071; B01J 20/28073; B01J 20/20; B01J 20/2808; B01J 20/28083; B01J 20/28085; B01J 20/3085; B01J 21/063; B01J 35/0013; B01J 35/004; B01J 35/026; B01J 35/1004; B01J 35/1038; B01J 35/1042; B01J 35/1057; B01J 35/1061; B01J 35/1066; B01J 37/0072
See application file for complete search history.

(56) References Cited

U.S. PATENT DOCUMENTS

| | | |
|---|---|---|
| 7,387,839 B2 | 6/2008 | Gueneau |
| 2006/0110318 A1 | 5/2006 | Torardi |
| 2013/0004771 A1 | 1/2013 | Mizue et al. |

FOREIGN PATENT DOCUMENTS

| | | | |
|---|---|---|---|
| EP | 1148030 | 10/2001 | |
| EP | 1 616 840 | 1/2006 | |
| EP | 1657219 A2 * | 5/2006 | ............ B01J 21/063 |
| JP | 63-8218 A | 1/1988 | |
| JP | 1988008218 | 1/1988 | |
| JP | S63 8218 | 1/1988 | |
| JP | 1990022127 | 1/1990 | |
| JP | 1990283617 | 11/1990 | |
| JP | 1997067125 | 3/1997 | |
| JP | H09-67125 A | 3/1997 | |
| JP | H09-278443 A | 10/1997 | |
| JP | 2001-26423 A1 | 1/2001 | |
| JP | 3 198238 | 8/2001 | |
| JP | 2003 201120 | 7/2003 | |
| JP | 2003-286011 | 10/2003 | |
| JP | 2004 033819 | 2/2004 | |
| JP | 2006-273646 A | 10/2006 | |
| JP | 2006-290680 A | 10/2006 | |
| JP | 2006-335619 A | 12/2006 | |
| JP | 2007-190514 A | 8/2007 | |
| JP | 2009-120422 A | 6/2009 | |
| JP | 2010-120841 A | 6/2010 | |
| JP | 2011 0643496 | 3/2011 | |
| JP | 2012 144399 | 8/2012 | |
| JP | 2012-144399 | 8/2012 | |
| JP | 2013-203929 A | 10/2013 | |
| JP | 2014-015340 | 1/2014 | |
| JP | 2014 015340 | 1/2014 | |
| SU | 1 646 992 | 5/1991 | |
| WO | 2011/077084 | 6/2011 | |
| WO | WO 2012/017752 A | 2/2012 | |

OTHER PUBLICATIONS

Ceci le Charbonneau et al: 11 Aqueous solution synthesis of nanocrystalline TiO2 powders: kinetics, characterization and application to fabrication of dye-sensitized solar cell photoanodes (phD Thes i s) 11 , Jan. 1, 2011 (Jan. 1, 2011), XP055471698, Montreal, Canada, Retrieved from the Internet: URL:http://digitool.library.mcgill.ca/thes isfile103625.pdf.

European Search Report issued in corresponding European Patent Application No. 18157072.2-1101, based on PCT/JP2015068781, dated May 28, 2018, pp. 1-10.

European Search Report issued in corresponding European Patent Application No. 15 814 239.8, dated Feb. 7, 2019 pp. 1-8.

European Search Report issued in corresponding European Patent Application No. 15 814 239.8, dated Feb. 7, 2019 pp. 1-2.

Japanese Office Action issued in corresponding Japanese Patent Application No. 2016-531382, based on PCT/JP2015068781, dated May 7, 2019, pp. 1-4, and machine translation pp. 1-7.

European Office Action issued in corresponding European Patent Application No. 20152430.3, dated May 18, 2019, pp. 1-9.

* cited by examiner ature range on hydrolyzing titanium(oxy)chloride in an aqueous solvent are important; by controlling these ranges,# TITANIUM OXIDE FINE PARTICLES AND METHOD FOR PRODUCING SAME This application is the national phase of international application PCT/JP2015/068781 filed 30 Jun. 2015 which designated the U.S.

TECHNICAL FIELD

The present invention relates to titanium oxide fine particles and a method for producing the same.

BACKGROUND ART

Titanium oxide having an average primary particle diameter of 0.1 μm or less, which is referred to as titanium oxide fine particles, is transparent to visible light and has the ability of blocking ultraviolet light. By utilizing such properties, titanium oxide fine particles are used as sunscreen cosmetics and ultraviolet light-blocking paints. Additionally, since the titanium oxide fine particles have a large specific surface area, they are used as catalyst carriers for denitration catalysts, dioxin decomposition catalysts, or the like. Also, the titanium oxide fine particles are excited by ultraviolet radiation to exhibit optical catalyst action, hydrophilic action, or anti-fogging action, and thus are used for optical catalysts, solar cells, or the like. Furthermore, the titanium oxide fine particles are used as raw materials for producing titanium composite oxides such as barium titanate, strontium titanate, lithium titanate, or the like.

As a method for producing titanium oxide fine particles, there is known a method of hydrolyzing a titanium tetrachloride aqueous solution in a liquid phase. For example, Patent Literature 1 discloses that a titanium tetrachloride aqueous solution is hydrolyzed while hydrogen chloride generated by its hydrolysis is prevented from escaping from the reaction vessel. And, Patent Literature 2 discloses that titanium tetrachloride, water and polyvalent carboxylic acid are mixed at a temperature less than 50° C. and then the mixed solution is heated to conduct a hydrolysis reaction to thereby generate titanium oxide. Patent Literature 3 discloses that a titanium tetrachloride aqueous solution is neutralized and hydrolyzed with an alkaline solution while maintained at 5 to 30° C. to deposit colloidal amorphous titanium hydroxide and that this deposit is aged at a temperature of 60 to 80° C. for 1 to 10 hours to thereby obtain a fine titania sol having an average crystallite diameter of 5 to 13 nm. Patent Literature 4 discloses that titanium tetrachloride and hydrochloric acid are mixed each in an amount of 1 to 5% by mass into water at 65 to 90° C. and hydrolyzed while the temperature of the mixed solution is maintained in a temperature range from 65° C. to the boiling point of the mixed solution to thereby produce titanium oxide particles having a rutile content of 50 to 99.9% by mass, a BET specific surface area of more than 50 m$^2$/g and 300 m$^2$/g or less, and an average particle diameter of the primary particle in the range of 5 to 100 nm. Furthermore, Patent Literature 5 discloses that in a process of mixing and reacting a titanium compound aqueous solution such as a titanium tetrachloride aqueous solution and a base to hydrolyze the titanium compound therein, the hydrolysis of the titanium compound is conducted by mixing and reacting the titanium compound aqueous solution and the base with a dispersion liquid prepared by in advance dispersing anatase titanium oxide fine particles in an aqueous medium.

CITATION LIST

Patent Literature

Patent Literature 1: JP 9-67125A
Patent Literature 2: JP 9-278443A
Patent Literature 3: JP 2001-26423A
Patent Literature 4: JP 2006-335619A
Patent Literature 5: JP 2009-120422A

SUMMARY OF INVENTION

Technical Problem

According to the methods of the conventional techniques described above, the titanium oxide fine particles having a high purity of $TiO_2$ and a small primary particle diameter can be produced because titanium tetrachloride is used as the starting material. However, since these methods are wet processes (liquid phase processes), a large number of primary particles agglomerate to form an agglomerated particle, and thus the formed agglomerated particle tends to have a significantly large diameter as an agglomerated particle diameter. As a result, there are the following problems, for example: the transparency, the ability of blocking ultraviolet light, or the like tends to be reduced; the reactivity with barium, lithium, or the like is reduced when producing a titanium composite oxide such as barium titanate, lithium titanate, or the like; dispersing and carrying a catalyst component on the titanium oxide fine particles is difficult; and the ability of adsorbing a component to be treated is reduced to thereby decrease in the activity of the resulting catalyst, photocatalyst, adsorbent, or the like.

Solution to Problem

The present inventors have found, as a result of reviewing hydrolysis conditions for titanium(oxy)chloride ("titanium (oxy)chloride" herein means titanium chloride or titanium oxychloride), the following: the pH range and the temperature range on hydrolyzing titanium(oxy)chloride in an aqueous solvent are important; by controlling these ranges, titanium oxide fine particles which have a small primary particle diameter as well as which form the agglomerated particle having a relatively small particle diameter as an agglomerated particle diameter can be produced; and desirable titanium oxide fine particles can be produced by conducting the hydrolysis two times, for example, by a method of conducting a hydrolysis of titanium(oxy)chloride in the aqueous solvent while maintaining the specific pH range and the specific temperature range, and then adding titanium (oxy)chloride and an alkali concurrently to the aqueous solution to conduct a hydrolysis thereof again. As a result, the present invention has been completed.

Namely, the present invention is as follows, for example:
1. Titanium oxide fine particles having a BET diameter of 1 to 50 nm, an agglomerated particle of 1 to 200 nm as diameter of an agglomerated particle formed by the titanium oxide fine particles, and a value of 1 to 40 as a ratio therebetween (namely, a ratio of the agglomerated particle diameter/the BET diameter);
2. A method for producing titanium oxide fine particles, comprising mixing a titanium(oxy)chloride and an alkali into an aqueous solvent heated to a temperature of 50 to 110° C. to fall a pH of an aqueous solution prepared thereby within a range of 0 to 12, to thereby hydrolyze the titanium (oxy)chloride;

3. A method for producing titanium oxide fine particles, comprising the steps of:
adjusting a pH of an aqueous solution including a titanium (oxy)chloride to a range of 1 or less;
subsequently heating the aqueous solution to a temperature of 50 to 110° C.; and
thereby hydrolyzing the titanium(oxy)chloride;

4. A method for producing titanium oxide fine particles, comprising the steps of:
mixing an alkali into an aqueous solution including a titanium(oxy)chloride to fall a pH of the aqueous solution within a range of 0 to 9;
subsequently heating the aqueous solution to a temperature of 50 to 110° C.; and
thereby hydrolyzing the titanium(oxy)chloride;

5. A method for producing titanium oxide fine particles, comprising the steps of:
conducting, as a first hydrolysis, any one of the methods according to 2 to 4 as described above; and
subsequently conducting, as a second hydrolysis, any one of the methods according to 2 to 4 as described above, again.

More specifically, the present invention is as follows:
(1) Titanium oxide fine particles having a BET diameter of 1 to 50 nm, an agglomerated particle of 1 to 200 nm as diameter of an agglomerated particle formed by the titanium oxide fine particles, and a value of 1 to 40 as a ratio therebetween (namely, a ratio of the agglomerated particle diameter/the BET diameter);
(2) The titanium oxide fine particles according to (1), having an anatase crystal form and/or a rutile crystal form;
(3) The titanium oxide fine particles according to (1) or (2), comprising pores having a diameter of 1 to 100 nm, wherein the pores have a pore volume of 0.2 to 0.7 ml/g;
(4) A method for producing titanium oxide fine particles, comprising mixing a titanium(oxy)chloride and an alkali into an aqueous solvent heated to a temperature of 50 to 110° C. to fall a pH of an aqueous solution prepared thereby within a range of 0 to 12, and thereby hydrolyzing the titanium(oxy)chloride;
(5) A method for producing titanium oxide fine particles, comprising the steps of:
adjusting a pH of an aqueous solution including a titanium (oxy)chloride to a range of 1 or less;
subsequently heating the aqueous solution to a temperature of 50 to 110° C.; and
thereby hydrolyzing the titanium(oxy)chloride;
(6) A method for producing titanium oxide fine particles, comprising the steps of:
mixing an alkali into an aqueous solution including a titanium(oxy)chloride to fall a pH of the aqueous solution within a range of 0 to 9;
subsequently heating the aqueous solution to a temperature of 50 to 110° C.; and
thereby hydrolyzing the titanium(oxy)chloride;
(7) A method for producing titanium oxide fine particles, comprising the steps of:
a first step of mixing a titanium(oxy)chloride and an alkali into an aqueous solvent heated to a temperature of 50 to 110° C. to fall a pH of an aqueous solution prepared thereby within a range of 0 to 12, and thereby conducting a hydrolysis of the titanium(oxy)chloride as a first hydrolysis; and
a second step of subsequently mixing a titanium(oxy) chloride and an alkali into the aqueous solution which includes a product from the first hydrolysis and which is adjusted to a temperature of 50 to 110° C., to fall a pH of the aqueous solution within a range of 0 to 12, and thereby conducting a hydrolysis of the titanium(oxy)chloride present in the second step as a second hydrolysis;
(8) A method for producing titanium oxide fine particles, comprising the steps of:
a first step of mixing a titanium(oxy)chloride and an alkali into an aqueous solvent heated to a temperature of 50 to 110° C. to fall a pH of an aqueous solution prepared thereby within a range of 0 to 12, and thereby conducting a hydrolysis of the titanium(oxy)chloride as a first hydrolysis; and
a second step of subsequently mixing a titanium(oxy) chloride into the aqueous solution including a product from the first hydrolysis to adjust a pH of the aqueous solution to a range of 1 or less, followed by adjusting a temperature of the aqueous solution to a range of 50 to 110° C., and thereby conducting a hydrolysis of the titanium(oxy)chloride present in the second step as a second hydrolysis;
(9) A method for producing titanium oxide fine particles, comprising the steps of:
a first step of mixing a titanium(oxy)chloride and an alkali into an aqueous solvent heated to a temperature of 50 to 110° C. to fall a pH of an aqueous solution prepared thereby within a range of 0 to 12, and thereby conducting a hydrolysis of the titanium(oxy)chloride as a first hydrolysis; and
a second step of subsequently mixing a titanium(oxy) chloride into the aqueous solution including a product from the first hydrolysis and mixing an alkali into the aqueous solution to fall a pH of the aqueous solution within a range of 0 to 9, followed by adjusting a temperature of the aqueous solution to a range of 50 to 110° C., and thereby conducting a hydrolysis of the titanium(oxy)chloride present in the second step as a second hydrolysis;
(10) A method for producing titanium oxide fine particles, comprising the steps of:
a first step of adjusting a pH of an aqueous solution including a titanium(oxy)chloride to a range of 1 or less, followed by heating the aqueous solution to a temperature of 50 to 110° C., and thereby conducting a hydrolysis of the titanium(oxy)chloride as a first hydrolysis; and
a second step of subsequently mixing a titanium(oxy) chloride and an alkali into the aqueous solution which includes a product from the first hydrolysis and which is adjusted to a temperature of 50 to 110° C., to fall a pH of the aqueous solution within a range of 0 to 12, and thereby conducting a hydrolysis of the titanium(oxy)chloride present in the second step as a second hydrolysis;
(11) A method for producing titanium oxide fine particles, comprising the steps of:
a first step of adjusting a pH of an aqueous solution including a titanium(oxy)chloride to a range of 1 or less, followed by heating the aqueous solution to a temperature of 50 to 110° C., and thereby conducting a hydrolysis of the titanium(oxy)chloride as a first hydrolysis; and
a second step of subsequently mixing a titanium(oxy) chloride into the aqueous solution including a product from the first hydrolysis to adjust a pH of the aqueous solution to a range of 1 or less, followed by adjusting a temperature of the aqueous solution to a range of 50 to 110° C., and thereby conducting a hydrolysis of the titanium(oxy)chloride present in the second step as a second hydrolysis;
(12) A method for producing titanium oxide fine particles, comprising the steps of:
a first step of adjusting a pH of an aqueous solution including a titanium(oxy)chloride to a range of 1 or less, followed by heating the aqueous solution to a temperature of 50 to 110° C., and thereby conducting a hydrolysis of the titanium(oxy)chloride as a first hydrolysis; and a second step of subsequently mixing a titanium(oxy) chloride into the aqueous solution including a product from the first hydrolysis and mixing an alkali into the aqueous solution to fall a pH of the aqueous solution within a range of 0 to 9, followed by adjusting a temperature of the aqueous solution to a range of 50 to 110° C., and thereby conducting a hydrolysis of the titanium(oxy)chloride present in the second step as a second hydrolysis;

(13) A method for producing titanium oxide fine particles, comprising the steps of:

a first step of mixing an alkali into an aqueous solution including a titanium(oxy)chloride to fall a pH of the aqueous solution within a range of 0 to 9, followed by heating the aqueous solution to a temperature of 50 to 110° C., and thereby conducting a hydrolysis of the titanium(oxy)chloride as a first hydrolysis; and a second step of subsequently mixing a titanium(oxy) chloride and an alkali into the aqueous solution which includes a product from the first hydrolysis and which is adjusted to a temperature of 50 to 110° C., to fall a pH of the aqueous solution within a range of 0 to 12, and thereby conducting a hydrolysis of the titanium(oxy)chloride present in the second step as a second hydrolysis;

(14) A method for producing titanium oxide fine particles, comprising the steps of:

a first step of mixing an alkali into an aqueous solution including a titanium(oxy)chloride to fall a pH of the aqueous solution within a range of 0 to 9, followed by heating the aqueous solution to a temperature of 50 to 110° C., and thereby conducting a hydrolysis of the titanium(oxy)chloride as a first hydrolysis; and a second step of subsequently mixing a titanium(oxy) chloride into an aqueous solution including a product from the first hydrolysis to adjust a pH of the aqueous solution to a range of 1 or less, followed by adjusting a temperature of the aqueous solution to a range of 50 to 110° C., and thereby conducting a hydrolysis of the titanium(oxy)chloride present in the second step as a second hydrolysis;

(15) A method for producing titanium oxide fine particles, comprising the steps of:

a first step of mixing an alkali into an aqueous solution including a titanium(oxy)chloride to fall a pH of the aqueous solution within a range of 0 to 9, followed by heating the aqueous solution to a temperature of 50 to 110° C., and thereby conducting a hydrolysis of the titanium(oxy)chloride as a first hydrolysis; and a second step of subsequently mixing a titanium(oxy) chloride into the aqueous solution including a product from the first hydrolysis and mixing an alkali into the aqueous solution to fall a pH of the aqueous solution within a range of 0 to 9, followed by adjusting a temperature of the aqueous solution to a range of 50 to 110° C., and thereby conducting a hydrolysis of the titanium(oxy)chloride present in the second step as a second hydrolysis;

(16) The method for producing titanium oxide fine particles according to any of (7) to (15), wherein a mass ratio of the product from the first hydrolysis to a product from the second hydrolysis is in a range between 3:97 and 70:30;

(17) The method for producing titanium oxide fine particles according to any of (7) to (16), wherein the first hydrolysis and the second hydrolysis are conducted in one reaction vessel;

(18) The method for producing titanium oxide fine particles according to any of (7) to (17), wherein a product from the second hydrolysis is deposited and grown on a particle surface of the product from the first hydrolysis;

(19) A method for producing titanium oxide fine particle powder, comprising the steps of:

adding an alkali or acid to an aqueous solution including the titanium oxide fine particles produced by the method according to any of (4) to (18) to adjust a pH of the aqueous solution to a range of 6.0 to 8.0; and subsequently conducting a filtration and drying of the aqueous solution;

(20) A method for producing titanium oxide fine particle powder, comprising firing the titanium oxide fine particles produced by the method according to any of (4) to (19); and

(21) A composite oxide comprising a reaction product of titanium oxide fine particles according to any of (1) to (3) and at least one metal element (except for titanium).

Advantageous Effects of Invention

The titanium oxide fine particles of the present invention have a small primary particle diameter, and further provide a small agglomerated particle diameter and a low degree of agglomeration. Thus, the titanium oxide fine particles of the present invention have a good reactivity with barium, lithium, or the like, and are suitable as raw materials for producing these titanium composite oxides. Since the titanium oxide fine particles of the present invention have a large specific surface area, it is easy to disperse and carry a catalyst component thereon, and the ability of adsorbing a component to be treated is good. Thus, the titanium oxide fine particles of the present invention are suitably used for catalyst carriers, catalysts, photocatalysts, adsorbents or the like.

The method for producing titanium oxide fine particles of the present invention is a simple method of controlling the pH and temperature ranges of an aqueous solution when conducting the hydrolysis of titanium(oxy)chloride in the aqueous solution. Furthermore, the method is a simple method of conducting the hydrolysis in two steps, for example, the two steps of: the first step of conducting the first hydrolysis of titanium(oxy)chloride in an aqueous solution while maintaining the pH and temperature ranges in the aqueous solution; and the second step of subsequently conducting the second hydrolysis by further adding titanium (oxy)chloride to the aqueous solution from the first hydrolysis. Additionally, this method can be conducted in one reaction vessel, and thus is advantageous in respect of equipment.

DESCRIPTION OF EMBODIMENTS

Figure 1:
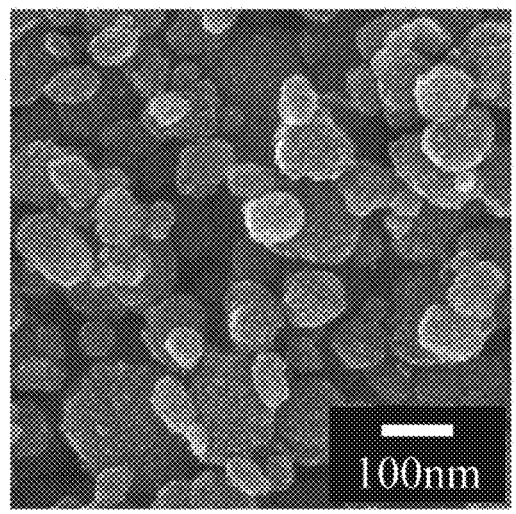
FIG. 1 is an electron micrograph of Sample A according to Example 1.

In the present invention, the titanium oxide includes, in addition to titanium dioxide and titanium monoxide, those referred to as hydrous titanium oxide, hydrated titanium oxide, metatitanic acid, orthotitanic acid, or the like. The titanium oxide may have a crystal form such as an anatase form and/or rutile form, may be amorphous (shapeless), and may be a mixture of them as appropriate. The crystal form of the titanium oxide can be identified by X-ray diffraction. The purity of the titanium oxide is preferably 99% by mass or more, more preferably 99.9% by mass or more, particularly in consideration of being used as raw materials for titanium composite oxides with barium, lithium or the like. Impurities included in the titanium oxide include chlorine, sulfur, alkali metals, alkaline earth metals, or the like. The impurities present in the titanium oxide are determined by fluorescent X-ray analysis, ICP analysis, or the like.

In the present invention, titanium oxide fine particles have a BET diameter of 1 to 50 nm, an agglomerated particle diameter of 1 to 200 nm as diameter of an agglomerated particle formed by the titanium oxide fine particles, and further value of 1 to 40 as a ratio therebetween (namely, a ratio of the agglomerated particle diameter/the BET diameter). The primary particle diameter of the titanium oxide fine particles is represented by the following BET diameter: 1 to 50 nm, preferably 5 to 30 nm, more preferably 5 to 15 nm. The finer particles have higher reactivity with barium, lithium, or the like. The BET diameter of the titanium oxide fine particles is determined by the following expression using the specific surface area "a" ($m^2/g$) calculated by the nitrogen adsorption method (BET method):

$$d=6/(\rho \cdot a)$$ Expression wherein d is the primary particle diameter (BET diameter) (μm), and ρ is the specific gravity of the titanium oxide ($g/cm^3$). The larger specific surface area "a" of the titanium oxide fine particles is more preferable because their BET diameter becomes smaller. Specifically, the specific surface area "a" is preferably from 50 to 400 $m^2/g$, more preferably from 100 to 300 $m^2/g$. The specific gravity of the anatase titanium oxide is 3.9, and the specific gravity of the rutile one is 4.2. Thus, when the specific surface area "a" is 50 $m^2/g$, the BET diameter is about 30 nm, and when the specific surface area "a" is 100 $m^2/g$, the BET diameter is about 15 nm. When the specific surface area "a" is 300 $m^2/g$, the BET diameter is about 5 nm.

The agglomerated particle diameter of the agglomerated particle formed by the titanium oxide fine particles can be determined by the following manner. A slurry is prepared by adding 30 ml of pure water and 3% by mass of a polycarboxylic acid dispersing agent with regard to the titanium oxide to 3 g of titanium oxide dry powder. This slurry and 60 g of zircon beads having a diameter of 0.09 mm as the medium were placed in a 70 ml mayonnaise jar and dispersed with a paint shaker for 60 minutes. Then, the particle size distribution of the dispersion slurry was measured with a laser diffraction/scattering particle size distribution analyzer (NanotracUPA manufactured by NIKKISO CO., LTD.). The particle diameter at 50% cumulative mass (D50) in the particle size distribution thus measured is determined as the agglomerated particle diameter. When this agglomerated particle diameter is small, it is indicated that the degree of agglomeration is low. Accordingly, a smaller agglomerated particle diameter is preferable. Specifically, the agglomerated particle diameter is from 1 to 200 nm, preferably from 10 to 150 nm, more preferably from 10 to 120 nm, still more preferably from 10 to 100 nm. The ratio between this agglomerated particle diameter and the BET diameter described above (namely, a ratio of the agglomerated particle diameter/the BET diameter) represents the degree of agglomeration. When this ratio is small, it is indicated that the degree of agglomeration is low. Specifically, the ratio is from 1 to 40, preferably from 3 to 30, more preferably from 5 to 15.

In the titanium oxide fine particles, the primary particles agglomerate to a certain extent to form an agglomerated particle, and thus gaps between the primary particles at this time can be seen as pores. The pore volume can be measured with a specific surface area measuring apparatus for the nitrogen adsorption method (BET method) described above. When the pore volume is large, the area contacting with barium, lithium and the like is large and the reactivity is good. Specifically, the pore volume of pores having a pore size (diameter) in the range of 1 to 100 nm is preferably in the range of 0.2 to 0.7 ml/g, more preferably of 0.3 to 0.5 ml/g.

The primary particle of the titanium oxide fine particles is constituted by assembly of crystallites. In order to make the primary particle diameter finer, it is preferred to make the crystallite diameter smaller. This crystallite diameter can be calculated from the X-ray diffraction peak such as the (110) face and the like using the following Scherrer's formula, and is, for example, from 20 to 250 Å, preferably from 20 to 150 Å, more preferably from 50 to 100 Å:

$$DHKL=K^*\lambda/\beta \cos \theta$$ Scherrer's formula wherein DHKL represents the average crystallite diameter (Å), λ represents the wavelength of the X-ray, β represents the half-value breadth of the diffraction peak, θ represents Bragg's angle, and K represents a constant.

The method for producing the titanium oxide fine particles of the present invention includes a method comprising conducting the hydrolysis of titanium(oxy)chloride in one step; and a method of conducting the hydrolysis of titanium (oxy)chloride in two steps (namely, a method of conducting the hydrolysis in two steps), in which a first hydrolysis (namely, the hydrolysis in the first step) is conducted according to the aforementioned method and in which a second hydrolysis (namely, the hydrolysis in the second step) is again conducted, subsequently. After the second hydrolysis, a third hydrolysis (namely, the hydrolysis in the third step) may be conducted, or after the third hydrolysis, a fourth hydrolysis (namely, the hydrolysis in the fourth step) may be conducted. In order to conduct the hydrolysis of titanium (oxy)chloride in one step, there are illustrated the following methods: (1) a method including mixing titanium(oxy)chloride and an alkali into an aqueous solvent heated to a temperature of 50 to 110° C. to fall the pH of an aqueous solution prepared thereby within the range of 0 to 12, to thereby hydrolyze the titanium(oxy)chloride (which is sometimes referred to as a "concurrent neutralization-hydrolysis method" hereinafter); (2) a method including adjusting the pH of an aqueous solution including titanium (oxy)chloride to the range of 1 or less, followed by heating the solution to a temperature of 50 to 110° C., and thereby hydrolyzing the titanium(oxy)chloride (which is sometimes referred to as a "hydrolysis method under acidic conditions" hereinafter); and (3) a method including mixing an alkali into an aqueous solution including titanium(oxy)chloride to fall the pH of the aqueous solution within the range of 0 to 9, followed by heating the aqueous solution to a temperature of 50 to 110° C., and thereby hydrolyzing the titanium(oxy) chloride (which is sometimes referred to as an "alkali-added hydrolysis method" hereinafter).

As the raw materials of titanium(oxy)chloride, titanium tetrachloride, titanium trichloride, titanium oxychloride, or the like can be used, and titanium tetrachloride is preferred.

The aqueous solvent (solvent included in the aqueous solution) is water or a mixed solvent prepared by mixing an organic solvent such as alcohol with water. The content of the organic solvent is preferably about 10% by mass or less.

Any compound that exhibits alkalinity can be used as the alkali, and examples thereof include hydroxides of alkali metals such as sodium hydroxide and potassium hydroxide, ammonium compounds such as ammonia water and ammonia gas, and amine compounds such as alkyl amines and ethanol amine. Ammonium compounds and amine compounds, which do not remain as impurities in the titanium oxide fine particles, are preferred. As an acid used for adjusting the pH, mineral acids such as hydrochloric acid, sulfuric acid and nitric acid, and organic acids such as acetic acid can be used. The hydrochloric acid and organic acids, which do not remain as impurities in titanium oxide fine particles are preferred.

It is also preferable to mix titanium(oxy)chloride, an alkali, and at least one selected from carboxylic acids, polyvalent carboxylic acids, and salts thereof into an aqueous solvent to thereby hydrolyze the titanium(oxy)chloride. After mixing at least one selected from carboxylic acids, polyvalent carboxylic acids, and salts thereof into an aqueous solvent, titanium(oxy)chloride may be mixed, or titanium(oxy)chloride and an alkali may be mixed. Titanium (oxy)chloride, an alkali, and at least one selected from carboxylic acids, polyvalent carboxylic acids, and salts thereof may be mixed concurrently and parallelly. The aforementioned carboxylic acids and polyvalent carboxylic acids are compounds having one or more carboxyl groups and can be used without limitation. For example, those as follows can be used, and in particular, citric acid and/or salts thereof are preferably used:

(a) carboxylic acids, for example, formic acid, acetic acid, and propionic acid;
(b) poly(polyvalent)carboxylic acids, particularly, dicarboxylic acids, tricarboxylic acids, for example, oxalic acid and fumaric acid;
(c) hydroxypoly(polyvalent)carboxylic acids, particularly, hydroxydi- or hydroxytricarboxylic acids, for example, malic acid, citric acid, or tartronic acid;
(d) (polyhydroxy)monocarboxylic acids, for example, glucoheptonic acid or gluconic acid;
(e) poly(polyvalent)(hydroxycarboxylic acids), for example, tartaric acid;
(f) dicarboxylic amino acids and the corresponding amide thereof, for example, aspartic acid, asparagine, or glutamic acid; and
(g) hydroxylated or non-hydroxylated monocarboxylic amino acids, for example, lysine, serine, or threonine.

As a carboxylate, any carboxylate may be used without limitation. For example, alkali metal salts such as sodium, potassium and the like, and ammonium salts can be used. The amount of the carboxylic acid, the polyvalent carboxylic acid and the salt thereof is preferably from 0.5 to 10% by mass, more preferably from 1 to 5% by mass with regard to the titanium oxide fine particles. Within the above range, the crystal form of the titanium oxide produced by addition of carboxylic acid or the like is easily controlled in the form as desired, and the particle shape is likely to be granular. Even if carboxylic acid or the like is added in an amount beyond the above range, it is difficult to obtain an additional effect.

(1) Concurrent Neutralization-Hydrolysis Method

This method is a method comprising the steps of: providing an aqueous solvent heated to a temperature of 50 to 110° C.; mixing titanium(oxy)chloride and an alkali into the aqueous solvent to fall a pH of this aqueous solution prepared thereby within the range of 0 to 12; and thereby hydrolyzing the titanium(oxy)chloride. It is preferable to add the titanium(oxy)chloride and the alkali concurrently and parallelly thereto. However, its addition may be conducted intermittently. The duration to add the titanium(oxy) chloride and the alkali to the aqueous solvent can be determined as appropriate, and the range of about 10 minutes to about 5 hours is preferred. The range of the pH is preferably any one range selected from a range of 0 to 2, a range of 2 to 7, a range of 7 to 9, and a range of 9 to 12, in view of reducing the degree of agglomeration.

(2) Hydrolysis Method Under Acidic Conditions

This method is a method comprising the steps of: providing an aqueous solution including titanium(oxy)chloride; adjusting a pH of this aqueous solution to a range of 1 or less, then heating the aqueous solution to a temperature of 50 to 110° C.; and thereby hydrolyzing the titanium(oxy) chloride. The pH adjustment can be controlled by the amount of the titanium(oxy)chloride. Also, the above acid may be added for the pH adjustment. A preferred pH range is from −1 to 1, and may be 0 or less which cannot be measured with a common pH meter. The heating time can be determined as appropriate, and the range of about 10 minutes to about 5 hours is preferred.

(3) Alkali-Added Hydrolysis Method

This method is a method comprising the steps of: providing an aqueous solution including titanium(oxy)chloride; mixing an alkali into the aqueous solution to fall a pH of this aqueous solution within a range of 0 to 9; then heating the aqueous solution to a temperature of 50 to 110° C.; and thereby hydrolyzing the titanium(oxy)chloride. The pH is adjusted to the range of 0 to 9 by mixing an alkali. The pH is preferably any one range selected from a range of 0 to 2, a range of 2 to 7, and a range of 7 to 9, in view of reducing the degree of agglomeration. The heating time can be determined as appropriate, and the range of about 10 minutes to about 5 hours is preferred.

The method of conducting the hydrolysis in two steps is, specifically, a method comprising the steps of: conducting any one of the above methods (1) to (3) as the first hydrolysis; and subsequently conducting any one of the above methods (1) to (3) again as the second hydrolysis. Each condition such as the temperature, time, pH, and addition of carboxylic acid when conducting the hydrolysis can be conducted according to each condition described above. The mass ratio of the product from the first hydrolysis to the product from the second hydrolysis is preferably in the range between 1:99 and 99:1, more preferably in the range between 2:98 and 90:10, more preferably in the range between 3:97 and 70:30, still more preferably in the range between 5:95 and 50:50.

Additionally, it is preferable that the reaction of the first hydrolysis and the reaction of the second hydrolysis are conducted in one reaction vessel by successively conducting the first hydrolysis reaction followed by the second hydrolysis. In contrast, the product is filtrated after the first hydrolysis reaction, further washed as required, and then may be repulped in an aqueous solvent, and be subsequently subjected to the second hydrolysis reaction. In this case, two reaction vessels are used.

Furthermore, the product of the second hydrolysis is preferably deposited and grown on the surface of the particles of the product from the first hydrolysis, by which formation of agglomerated particles can be prevented. However, the product from the first hydrolysis and the product from the second hydrolysis may be formed as a separate product each other.

(4) Concurrent Neutralization-Hydrolysis Method→Concurrent Neutralization-Hydrolysis Method In this method, an aqueous solvent heated to a temperature of 50 to 110° C. is provided; and titanium(oxy)chloride and an alkali are mixed thereinto to fall a pH of an aqueous solution prepared thereby within the range of 0 to 12; and thereby a hydrolysis of the titanium(oxy)chloride is conducted as a first hydrolysis. As the subsequent step, the aqueous solution which includes a product from the first hydrolysis and which is adjusted to a temperature of 50 to 110° C. is provided; and titanium(oxy)chloride and an alkali are mixed thereinto to fall a pH of this aqueous solution prepared thereby within the range of 0 to 12; and thereby a hydrolysis of the titanium(oxy)chloride present in this step is conducted as a second hydrolysis. In other words, in the second hydrolysis, into the aqueous solution which includes the product from the first hydrolysis (the product obtained from the hydrolysis of titanium(oxy)chloride in the first step) and which is adjusted to a temperature of 50 to 110° C., titanium(oxy)chloride and an alkali are mixed again while maintaining a pH of this aqueous solvent in the range of 0 to 12; and thereby a hydrolysis of the titanium(oxy)chloride present in the second step is conducted.

(5) Concurrent Neutralization-Hydrolysis Method→Hydrolysis Method Under Acidic Conditions In this method, an aqueous solvent heated to a temperature of 50 to 110° C. is provided; titanium(oxy)chloride and an alkali are mixed thereinto to fall a pH of this aqueous solution prepared thereby within a range of 0 to 12; and thereby a hydrolysis of the titanium(oxy)chloride is conducted as a first hydrolysis. As the subsequent step, the aqueous solution including a product from the first hydrolysis is provided; titanium(oxy)chloride is again mixed thereinto to fall a pH thereof within the range of 1 or less; followed by adjusting a temperature of this aqueous solution to a range of 50 to 110° C.; and thereby a hydrolysis of the titanium(oxy)chloride present in this step is conducted as a second hydrolysis.

(6) Concurrent Neutralization-Hydrolysis Method→Alkali-Added Hydrolysis Method

In this method, an aqueous solvent heated to a temperature of 50 to 110° C. is provided; titanium(oxy)chloride and an alkali are mixed thereinto to fall a pH of this aqueous solution prepared thereby within a range of 0 to 12; and thereby a hydrolysis of the titanium(oxy)chloride is conducted as a first hydrolysis. As the subsequent step, the aqueous solution including a product from the first hydrolysis is provided; titanium(oxy)chloride is again mixed thereinto, then an alkali is again mixed thereinto to fall a pH thereof within a range of 0 to 9; subsequently this aqueous solution is adjusted to a temperature of 50 to 110° C.; and thereby a hydrolysis of the titanium(oxy)chloride present in this step is conducted as a second hydrolysis.

(7) Hydrolysis Method Under Acidic Conditions→Concurrent Neutralization-Hydrolysis Method In this method, an aqueous solution including titanium(oxy)chloride is provided, a pH thereof is adjusted to a range of 1 or less; then the aqueous solution is heated to a temperature of 50 to 110° C.; and thereby a hydrolysis of the titanium(oxy)chloride is conducted as a first hydrolysis. As the subsequent step, the aqueous solution which includes a product from the first hydrolysis and which is adjusted to a temperature of 50 to 110° C. is provided; and titanium(oxy)chloride and an alkali are again mixed thereinto to fall a pH of this aqueous solution within a range of 0 to 12; and thereby a hydrolysis of the titanium(oxy)chloride present in this step is conducted as a second hydrolysis.

(8) Hydrolysis Method Under Acidic Conditions→Hydrolysis Method Under Acidic Conditions In this method, an aqueous solution including titanium(oxy)chloride is provided; a pH thereof is adjusted to a range of 1 or less; then the aqueous solution is heated to a temperature of 50 to 110° C.; and thereby a hydrolysis of the titanium(oxy)chloride is conducted as a first hydrolysis. As the subsequent step, the aqueous solution including a product from the first hydrolysis is provided; titanium(oxy)chloride is again mixed thereinto to adjust a pH thereof to a range of 1 or less; then this aqueous solution is adjusted to a temperature of 50 to 110° C.; and thereby a hydrolysis of the titanium(oxy)chloride present in the second step is conducted as a second hydrolysis.

(9) Hydrolysis Method Under Acidic Conditions→Alkali-Added Hydrolysis Method

In this method, an aqueous solution including titanium(oxy)chloride is provided; a pH thereof is adjusted to a range of 1 or less; then the aqueous solution is heated to a temperature of 50 to 110° C.; and thereby a hydrolysis of the titanium(oxy)chloride is conducted as a first hydrolysis. As the subsequent step, the aqueous solution including a product from the first hydrolysis is provided; titanium(oxy)chloride is mixed thereinto; then an alkali is again mixed thereinto to fall a pH of the aqueous solution within a range of 0 to 9; subsequently a temperature of this aqueous solution is adjusted to a range of 50 to 110° C.; and thereby a hydrolysis of the titanium(oxy)chloride present in this step is conducted as a second hydrolysis.

(10) Alkali-Added Hydrolysis Method→Concurrent Neutralization-Hydrolysis Method

In this method, an aqueous solution including titanium(oxy)chloride is provided; an alkali is mixed thereinto to fall a pH thereof within a range of 0 to 9; then the aqueous solution is heated to a temperature of 50 to 110° C.; and thereby a hydrolysis of the titanium(oxy)chloride is conducted as a first hydrolysis. As the subsequent step, the aqueous solution which includes a product from the first hydrolysis and which is adjusted to a temperature of 50 to 110° C. is provided; titanium(oxy)chloride and an alkali are again mixed thereinto to fall a pH thereof within a range of 0 to 12; and thereby a hydrolysis of the titanium(oxy)chloride present in this step is conducted as a second hydrolysis.

(11) Alkali-Added Hydrolysis Method→Hydrolysis Method Under Acidic Conditions

In this method, an aqueous solution including titanium (oxy)chloride is provided; an alkali is mixed thereinto to fall a pH thereof within a range of 0 to 9; then the aqueous solution is heated to a temperature of 50 to 110° C.; and thereby a hydrolysis of the titanium(oxy)chloride is conducted as a first hydrolysis. As the subsequent step, the aqueous solution including a product from the first hydrolysis is provided; titanium(oxy)chloride is again mixed thereinto to adjust a pH thereof to a range of 1 or less; then this aqueous solution is adjusted to a temperature of 50 to 110° C.; and thereby a hydrolysis of the titanium(oxy)chloride present in this step is conducted as a second hydrolysis.

(12) Alkali-Added Hydrolysis Method→Alkali-Added Hydrolysis Method

In this method, an aqueous solution including titanium (oxy)chloride is provided; an alkali is mixed thereinto to fall a pH thereof within a range of 0 to 9, then the aqueous solution is heated to a temperature of 50 to 110° C., and thereby a hydrolysis of the titanium(oxy)chloride is conducted as a first hydrolysis. As the subsequent step, the aqueous solution including a product from the first hydrolysis is provided; titanium(oxy)chloride is again mixed thereinto; then an alkali is again mixed thereinto to fall a pH thereof within a range of 0 to 9; subsequently this aqueous solution is adjusted to a temperature of 50 to 110° C.; and thereby a hydrolysis of the titanium(oxy)chloride present in this step is conducted as a second hydrolysis.

Aging may be conducted by the following manner: an alkali or an acid is added to an aqueous solution including titanium oxide fine particles produced by any of the methods as described above to thereby adjust a pH of the aqueous solution to the range of 0 to 9; and further the temperature of the aqueous solvent is maintained from 50 to 90° C. The aging time ranges from about 10 minutes to about 5 hours. Aging can increase the crystallinity of the titanium oxide fine particles, can suppress the degree of agglomeration, and can also adjust the primary particle diameter (BET diameter) to an appropriate range. Titanium oxide fine particle powder can be also produced by adding an alkali or an acid to the aqueous solution including the titanium oxide fine particles produced by any of the methods as described above to adjust a pH thereof to a range of 6.0 to 8.0, and subsequently conducting filtration and drying.

The titanium oxide fine particles produced by any of the methods as described above may be also fired. The firing temperature is preferably of about 150 to about 800° C., and the range of 150 to 600° C. is more preferred in view of the good reactivity to barium, lithium and the like, and little reduction in the specific surface area. The firing time can be determined as appropriate, and the time range of about 1 to about 10 hours is appropriate. The firing atmosphere can be conducted under an atmosphere including oxygen gas or an atmosphere of inert gas such as nitrogen.

Additionally, the titanium oxide fine particles obtained may be subjected to wet pulverization and particle size regulation by known methods as appropriate. Thereafter, furthermore, in the same manner as usually conducted for conventional pigment titanium dioxide and titanium oxide fine particles, their particle surfaces may be treated to be coated with at least one hydrous oxide, hydroxide, oxide or the like selected from the group consisting of aluminum, silicon, zirconium, tin, titanium, and zinc. The amount for the coating treatment is preferably from 1 to 50% by mass, more preferably 5 to 30% by mass in total, with regard to the substrate titanium oxide fine particles. When using the titanium oxide fine particles obtained as a catalyst carrier, a catalyst, a photocatalyst, or an adsorbent, the particles may carry a catalyst component, for example, a metal such as platinum, tungsten, copper, silver, or gold, or a compound in a usual manner.

The surfaces of the titanium oxide fine particles may be also treated to be coated with an organic compound such as a fatty acid or a salt thereof, an alcohol, an alkoxysilane compound, or an aminoalkoxysilane compound. An alkoxysilane compound and/or an aminoalkoxysilane compound or the like may be coated in a hydrolyzed state. The amount of an organic compound used for the coating treatment is preferably from 1 to 50% by mass, more preferably from 5 to 30% by mass in total, with regard to the substrate titanium oxide fine particles. This range is preferred in view of avoiding the following problems: when the amount of the coating is an extremely small amount of less than 1% by mass, effects such as the desired light resistance are not achieved; and, in contrast, when the amount of the coating is an extremely large amount of more than 50% by mass, there is an economical disadvantage in addition to the occurrence of agglomeration. Two or more organic compound for coating treatment may be used in combination depending on applications and purposes. Examples of the alkoxysilane compound can include vinyltrimethoxysilane, methyltrimethoxysilane, propyltrimethoxysilane, i-butyltrimethoxysilane, n-butyltrimethoxysilane, n-hexyltrimethoxysilane, octyltrimethoxysilane, octyltriethoxysilane, n-decyltrimethoxysilane, and phenyltrimethoxylsilane. Examples of the aminoalkoxysilane compound can include γ-aminopropyltrimethoxysilane, γ-aminopropyltriethoxysilane, and N-β (aminoethyl) γ-aminopropyltrimethoxysilane.

In order to coat the titanium oxide fine particles with an organic compound, for example, any of the following (1) and (2) can be used: (1) a dry method in which the titanium oxide fine particles are placed in a high-speed stirring apparatus such as a Henschel mixer, the organic compound or an aqueous solution or an alcohol solution thereof is added by dropping or spraying thereto while stirring, and after the stirring is continued until homogeneous, the drying is conducted; and (2) a wet method in which the organic compound or an aqueous solution or an alcohol solution thereof is added to a slurry formed by dispersing titanium oxide fine particles in water while stirring, and after the stirring is sufficiently conducted, filtration, washing and drying are conducted.

A composite oxide comprising a reaction product of the titanium oxide fine particles of the present invention and at least one metal element (except for titanium) is fine as well as has a good crystallinity. The metal element may be at least one selected from the group consisting of typical metal elements (alkali metal elements (Group 1 elements), alkaline earth metal element (Group 2 elements), Group 12 elements, Group 13 elements, Group 14 elements, Group 15 elements), and transition metal elements (except for titanium). For example, lithium titanate is useful as a negative electrode active material for lithium secondary batteries, sodium titanate is useful as raw materials and intermediates for various titanate compound, and potassium titanate is useful as a filler. Additionally, calcium titanate, strontium titanate, and barium titanate are useful as dielectric materials and the like. In addition, for example, aluminum titanate, aluminum magnesium titanate and the like are useful as heat-resistant materials, and lead titanate and the like are useful as piezoelectrics. These composite oxides can be produced by mixing titanium oxide fine particles of the present invention and at least one metal compound, and firing the mixture as appropriate.

EXAMPLES

Examples of the present invention will be described hereinbelow, but the present invention will not be limited to those Examples.

Example 1

To 100 g/l of titanium tetrachloride aqueous solution, in terms of $TiO_2$, maintained at room temperature, 3% by mass of an anhydrous citric acid with regard to $TiO_2$ was added, and then the solution was stirred for 30 minutes (The pH was 0 or less). This solution was raised to the temperature of 92° C. and maintained with stirring for 30 minutes. Accordingly, the hydrolysis was conducted. Thereafter, the solution was cooled to 70° C. and neutralized with ammonia water to have the pH of 6.5, namely pH=6.5. The slurry including titanium oxide, which was obtained thereby was filtered, washed, and dried to yield a highly-pure titanium oxide fine particle powder (Sample A).

Example 2

The titanium oxide powder of Example 1 was fired in an electric furnace at the temperature of 500° C. for two hours to yield a highly-pure titanium oxide fine particles powder (Sample B).

Example 3

Ammonia water was added to a titanium tetrachloride aqueous solution to have the pH of 3.4, namely pH=3.4. This solution was raised to the temperature of 65° C. and maintained with stirring for 30 minutes. Accordingly, the first hydrolysis was conducted. Subsequently, a titanium tetrachloride aqueous solution was added and mixed so that a mass ratio of the product from the first hydrolysis in terms of $TiO_2$ to the product from a second hydrolysis in terms of $TiO_2$ has the value of 5:95, namely the product from the first hydrolysis in terms of $TiO_2$: the product from a second hydrolysis in terms of $TiO_2$=5:95. Subsequently, the aqueous solution was raised to the temperature of 70° C., and ammonia water was added thereto to have the pH of 6.7, namely pH=6.7. This solution was maintained with stirring for 30 minutes. Accordingly, the second hydrolysis was conducted. The slurry including titanium oxide, which was obtained thereby was filtered, washed, and dried to yield a highly-pure titanium oxide fine particle powder (Sample C).

Example 4

To one liter of ion exchange water heated to 70° C., each of a titanium tetrachloride aqueous solution corresponding to 100 g of $TiO_2$ and ammonia water was added simultaneously over 60 minutes while a pH thereof was maintained to have a range of 0.8 to 1.2, namely pH=0.8 to 1.2. Accordingly, the hydrolysis was conducted. The slurry including titanium oxide, which was obtained thereby was filtered, washed, and dried to yield a highly-pure titanium oxide fine particle powder (Sample D).

Example 5

The titanium oxide powder of Example 4 was fired in an electric furnace at the temperature of 400° C. for two hours to yield a highly-pure titanium oxide fine particles powder (Sample E).

Example 6

To one liter of ion exchange water heated to 60° C., each of a titanium tetrachloride aqueous solution corresponding to 100 g of $TiO_2$ and ammonia water was added simultaneously over 60 minutes while a pH thereof was maintained to have a range of 5.8 to 6.2, namely pH=5.8 to 6.2. Accordingly, the hydrolysis was conducted. The slurry including titanium oxide, which was obtained thereby was filtered, washed, and dried to yield a highly-pure titanium oxide fine particle powder (Sample F).

Example 7

The titanium oxide powder of Example 6 was fired in an electric furnace at the temperature of 370° C. for two hours to yield a highly-pure titanium oxide fine particles powder (Sample G).

Example 8

The titanium oxide powder of Example 6 was fired in an electric furnace at the temperature of 410° C. for two hours to yield a highly-pure titanium oxide fine particles powder (Sample H).

Example 9

The titanium oxide powder of Example 6 was fired in an electric furnace at the temperature of 530° C. for two hours to yield a highly-pure titanium oxide fine particles powder (Sample I).

Example 10

To one liter of ion exchange water heated to 60° C., each of a titanium tetrachloride aqueous solution corresponding to 100 g of $TiO_2$ and a sodium hydroxide aqueous solution was added simultaneously over 60 minutes while a pH thereof was maintained to have a range of 10.8 to 11.2, namely pH=10.8 to 11.2. Accordingly, the hydrolysis was conducted. The slurry including titanium oxide, which was obtained thereby was filtered, washed, and dried to yield titanium oxide fine particle powder (Sample J).

Example 11

To one liter of ion exchange water heated to 60° C., each of a titanium tetrachloride aqueous solution corresponding to 50 g of $TiO_2$ and ammonia water was added and mixed simultaneously over 60 minutes while a pH thereof was maintained to have a range of 0.8 to 1.2, namely pH=0.8 to 1.2. Accordingly, the first hydrolysis was conducted. Subsequently, a titanium tetrachloride aqueous solution corresponding to 50 g of $TiO_2$ was added and mixed thereto to adjust a pH of the mixed solution to 1 or less. Then, the mixed solution was raised to the temperature of 92° C. and maintained with stirring for 30 minutes. Accordingly, the second hydrolysis was conducted. The slurry including titanium oxide, which was obtained thereby was neutralized with ammonia water to have the pH of 6.5, namely pH=6.5, and then was filtered, washed, and dried to yield a highly-pure titanium oxide fine particle powder (Sample K). This reaction was entirely conducted in one reaction vessel.

Example 12

To one liter of ion exchange water heated to 60° C., each of a titanium tetrachloride aqueous solution corresponding to 50 g of $TiO_2$ and ammonia water was added and mixed simultaneously over 60 minutes while a pH thereof was maintained to have a range of 5.8 to 6.2, namely pH=5.8 to 6.2. Accordingly, the first hydrolysis was conducted. Subsequently, a titanium tetrachloride aqueous solution corresponding to 50 g of $TiO_2$ was added and mixed thereto to adjust a pH thereof to 1 or less. Then, the solution was raised to the temperature of 92° C. and maintained with stirring for 30 minutes. Accordingly, the second hydrolysis was conducted. The slurry including titanium oxide, which was obtained thereby was neutralized with ammonia water to have the pH of 6.5, namely pH=6.5, and then was filtered, washed, and dried to yield a highly-pure titanium oxide fine particle powder (Sample L). This reaction was entirely conducted in one reaction vessel.

Example 13

To one liter of ion exchange water heated to 60° C., each of a titanium tetrachloride aqueous solution corresponding to 50 g of $TiO_2$ and ammonia water was added and mixed simultaneously over 60 minutes while a pH thereof was maintained to have a range of 7.8 to 8.2, namely pH=7.8 to 8.2. Accordingly, the first hydrolysis was conducted. Subsequently, a titanium tetrachloride aqueous solution corresponding to 50 g of $TiO_2$ was added and mixed thereto to adjust a pH of the mixed solution to 1 or less. Subsequently, the solution was raised to the temperature of 92° C. and maintained with stirring for 30 minutes. Accordingly, the second hydrolysis was conducted. The slurry including titanium oxide, which was obtained thereby was neutralized with ammonia water to have the pH of 6.5, namely pH=6.5, and then was filtered, washed, and dried to yield a highly-pure titanium oxide fine particle powder (Sample M). This reaction was entirely conducted in one reaction vessel.

Example 14

To one liter of 30 g/l titanium tetrachloride aqueous solution, in terms of $TiO_2$, maintained at room temperature, 3% by mass of an anhydrous citric acid with regard to $TiO_2$ was added, and the solution was stirred for 30 minutes (The pH was 0 or less). This solution was raised to the temperature of 92° C. and maintained with stirring for 30 minutes. Accordingly, the first hydrolysis was conducted. Subsequently, at the temperature of 92° C., each of a titanium tetrachloride aqueous solution corresponding to 70 g of $TiO_2$ and ammonia water was added simultaneously thereto over 60 minutes while a pH thereof was maintained to have a range of 0.8 to 1.2, namely pH=0.8 to 1.2. Accordingly, the second hydrolysis was conducted. The slurry including titanium oxide, which was obtained thereby was neutralized with ammonia water to have the pH of 6.5, namely pH=6.5, and then was filtered, washed, and dried to yield a highly-pure titanium oxide fine particle powder (Sample N). This reaction was entirely conducted in one reaction vessel.

Example 15

The titanium oxide powder of Example 14 was fired in an electric furnace at a temperature of 400° C. for two hours to yield a highly-pure titanium oxide fine particles powder (Sample O).

Example 16

To one liter of 50 g/l titanium tetrachloride aqueous solution, in terms of $TiO_2$, maintained at room temperature, 3% by mass of an anhydrous citric acid with regard to $TiO_2$ was added and the solution was stirred for 30 minutes (The pH was 0 or less.). This solution was raised to the temperature of 92° C. and maintained with stirring for 30 minutes. Accordingly, the first hydrolysis was conducted. Subsequently, at the temperature of 92° C., each of a titanium tetrachloride aqueous solution corresponding to 50 g of $TiO_2$ and ammonia water was added simultaneously thereto over 60 minutes while a pH thereof was maintained to have a range of 0.8 to 1.2, namely pH=0.8 to 1.2. Accordingly, the second hydrolysis was conducted. The slurry including titanium oxide, which was obtained thereby was neutralized with ammonia water to have the pH of 6.5, namely pH=6.5, and then was filtered, washed, and dried to yield a highly-pure titanium oxide fine particle powder (Sample P). This reaction was entirely conducted in one reaction vessel.

Example 17

To one liter of 70 g/l titanium tetrachloride aqueous solution, in terms of $TiO_2$, maintained at room temperature, 3% by mass of an anhydrous citric acid with regard to $TiO_2$ was added and the solution was stirred for 30 minutes (The pH was 0 or less.). This solution was raised to the temperature of 92° C. and maintained with stirring for 30 minutes. Accordingly, the first hydrolysis was conducted. Subsequently, at the temperature of 92° C., each of a titanium tetrachloride aqueous solution corresponding to 30 g of $TiO_2$ and ammonia water was added simultaneously thereto over 60 minutes while a pH thereof was maintained to have a range of 0.8 to 1.2, namely pH=0.8 to 1.2. Accordingly, the second hydrolysis was conducted. The slurry including titanium oxide, which was obtained thereby was neutralized with ammonia water to have the pH of 6.5, namely pH=6.5, and then was filtered, washed, and dried to yield a highly-pure titanium oxide fine particle powder (Sample Q). This reaction was entirely conducted in one reaction vessel.

Example 18

To one liter of 50 g/l titanium tetrachloride aqueous solution, in terms of $TiO_2$, maintained at room temperature, 3% by mass of an anhydrous citric acid with regard to $TiO_2$ was added and the solution was stirred for 30 minutes (The pH was 0 or less.). This solution was raised to the temperature of 92° C. and maintained with stirring for 30 minutes. Accordingly, the first hydrolysis was conducted. Subsequently, at the temperature of 92° C., each of a titanium tetrachloride aqueous solution corresponding to 50 g of $TiO_2$ and a sodium hydroxide aqueous solution was simultaneously thereto over 60 minutes while a pH thereof was maintained to have a range of 10.8 to 11.2, namely pH=10.8 to 11.2. Accordingly, the second hydrolysis was conducted. The slurry including titanium oxide, which was obtained thereby was neutralized with hydrochloric acid to have the pH of 6.5, namely pH=6.5, and then was filtered, washed, and dried to yield a highly-pure titanium oxide fine particle powder (Sample R). This reaction was entirely conducted in one reaction vessel.

Example 19

To one liter of ion exchange water heated to 60° C., each of a titanium tetrachloride aqueous solution corresponding to 50 g of $TiO_2$ and ammonia water was added simultaneously over 30 minutes while a pH thereof was maintained to have a range of 5.8 to 6.2, namely pH=5.8 to 6.2. Accordingly, the first hydrolysis was conducted. Subsequently, each of a titanium tetrachloride aqueous solution corresponding to 50 g of $TiO_2$ and ammonia water was added simultaneously thereto over 30 minutes while a pH thereof was maintained to have a range of 0.8 to 1.2, namely pH=0.8 to 1.2. Accordingly, the second hydrolysis was conducted. The slurry including titanium oxide, which was obtained thereby was neutralized with ammonia water to have the pH of 6.5, namely pH=6.5, and then was filtered, washed, and dried to yield a highly-pure titanium oxide fine particle powder (Sample S). This reaction was entirely conducted in one reaction vessel.

Example 20

To one liter of ion exchange water heated to 60° C., each of a titanium tetrachloride aqueous solution corresponding to 50 g of $TiO_2$ and ammonia water was added simultaneously over 30 minutes while a pH thereof was maintained to have a range of 0.8 to 1.2, namely pH=0.8 to 1.2. Accordingly, the first hydrolysis was conducted. Subsequently, each of a titanium tetrachloride aqueous solution corresponding to 50 g of $TiO_2$ and ammonia water was added simultaneously thereto over 30 minutes while a pH thereof was maintained to have a range of 5.8 to 6.2, namely pH=5.8 to 6.2. Accordingly, the second hydrolysis was conducted. The slurry including titanium oxide, which was obtained thereby was neutralized with ammonia water to have the pH of 6.5, namely pH=6.5, and then was filtered, washed, and dried to yield a highly-pure titanium oxide fine particle powder (Sample T). This reaction was entirely conducted in one reaction vessel.

Example 21

To one liter of 50 g/l titanium tetrachloride aqueous solution, in terms of $TiO_2$, maintained at room temperature, 3% by mass of an anhydrous citric acid with regard to $TiO_2$ was added, and the solution was stirred for 30 minutes (The pH was 0 or less.). This solution was raised to the temperature of 92° C. and maintained with stirring for 30 minutes. Accordingly, the first hydrolysis was conducted. Subsequently, a titanium tetrachloride aqueous solution corresponding to 50 g of $TiO_2$ was added and mixed thereto to adjust a pH thereof to 1 or less. Then, the solution was raised to the temperature of 92° C. and maintained with stirring for 30 minutes. Accordingly, the second hydrolysis was conducted. The slurry including titanium oxide, which was obtained thereby was neutralized with ammonia water to have the pH of 6.5, namely pH=6.5, and then was filtered, washed, and dried to yield a highly-pure titanium oxide fine particle powder (Sample U). This reaction was entirely conducted in one reaction vessel.

Example 22

To one liter of 30 g/l titanium tetrachloride aqueous solution, in term of $TiO_2$, maintained at room temperature, 3% by mass of an anhydrous citric acid with regard to $TiO_2$ was added, and the solution was stirred for 30 minutes (The pH was 0 or less.). This solution was raised to the temperature of 92° C. and maintained with stirring for 30 minutes. Accordingly, the first hydrolysis was conducted. Subsequently, a titanium tetrachloride aqueous solution corresponding to 70 g of $TiO_2$ was added and mixed thereto to adjust a pH thereof to 1 or less. Then, the solution was raised to the temperature of 92° C. and maintained with stirring for 30 minutes. Accordingly, the second hydrolysis was conducted. The slurry including titanium oxide, which was obtained thereby was neutralized with ammonia water to have the pH of 6.5, namely pH=6.5, and then was filtered, washed, and dried to yield a highly-pure titanium oxide fine particle powder (Sample V). This reaction was entirely conducted in one reaction vessel.

Example 23

Ammonia water was added to a titanium tetrachloride aqueous solution to have the pH of 7.0, namely pH=7.0. The solution was raised to the temperature of 70° C. and maintained with stirring for 30 minutes. Then, the solution was raised to the temperature of 90° C. and maintained with stirring for 120 minutes. The slurry including titanium oxide, which was obtained thereby was filtered, washed, and dried to thereby yield a highly-pure titanium oxide fine particle powder (Sample W).

Comparative Example 1

To ammonia water maintained at room temperature, a titanium tetrachloride aqueous solution was added over 60 minutes to have the pH of 6.5, namely pH=6.5. Accordingly, the hydrolysis was conducted. The slurry including titanium oxide, which was obtained thereby was neutralized with ammonia water to have the pH of 6.5, namely pH=6.5, and then was filtered, washed, and dried to thereby yield a highly-pure titanium oxide fine particle powder (Sample a).

Comparative Example 2

To one liter of ion exchange water heated to 30° C., each of a titanium tetrachloride aqueous solution corresponding to 100 g of $TiO_2$ and ammonia water was added simultaneously over 60 minutes while a pH thereof was maintained to have a range of 5.8 to 6.2, namely pH=5.8 to 6.2. Accordingly, the hydrolysis was conducted. The slurry including titanium oxide, which was obtained thereby was filtered, washed, and dried to yield a highly-pure titanium oxide fine particle powder (Sample b).

Evaluation 1

BET specific surface area (m²/g): The BET specific surface area was determined using a flow type specific surface area automatic measuring device (product name: FlowSorb II 2300, manufactured by SHIMADZU CORPORATION) by the nitrogen adsorption method. In this case, desorption was conducted under a nitrogen gas flow and temperature conditions at room temperature, and adsorption was conducted under temperature conditions of 77K. From this BET specific surface area, the primary particle diameter (BET diameter) was calculated by expression:

$$d=6/(\rho \cdot a)$$

Evaluation 2

Crystal form and crystallite diameter: An X-ray diffraction spectrum was measured by using an X-ray diffractometer (product name: Ultima IV, manufactured by Rigaku Corporation) under conditions including X-ray tube: Cu, tube voltage: 40 kV, tube current: 40 mA, divergence slit: ½°, scattering slit: 8 mm, receiving slit: open, sampling width: 0.020 degrees, scanning rate: 10.00 degrees/minute. From this spectrum, the crystal form and the crystallite diameter were determined.

Evaluation 3

Pore volume (ml/g): The pore volume was determined for the pore diameter range of 1 to 100 nm by using an automatic specific surface area/pore size distribution measurement instrument (product name: BELSORP-mini II, manufactured by BEL Japan, Inc.) in accordance with the BJH method.

Evaluation 4

Preparation of slurry for evaluation: A slurry is prepared by adding 30 ml of pure water and 3% by mass of a polycarboxylic acid dispersing agent with regard to the titanium oxide to 3 g of titanium oxide dry powder. This slurry and 60 g of zircon beads having a diameter of 0.09 mm as the medium were placed in a 70 ml mayonnaise jar and dispersed with a paint shaker for 60 minutes.

Agglomerated particle diameter (nm): The agglomerated particle diameter was measured by using a laser diffraction/scattering particle size distribution analyzer (NanotracUPA manufactured by NIKKISO CO., LTD.). The particle diameter at 50% cumulative mass (D50) in the particle size distribution measured was determined as the agglomerated particle diameter.

Figure 2:
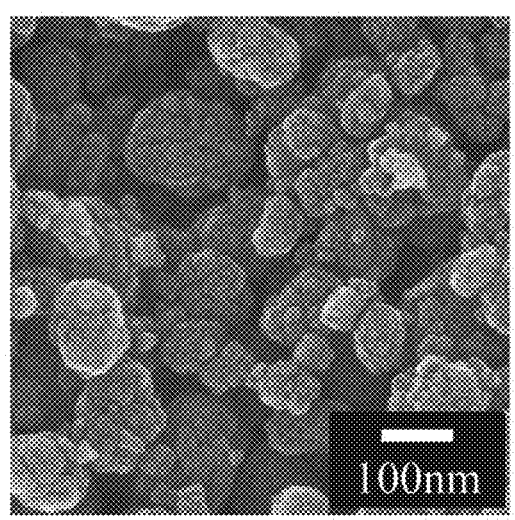
FIG. 2 is an electron micrograph of Sample B according to Example 2.
Figure 3:
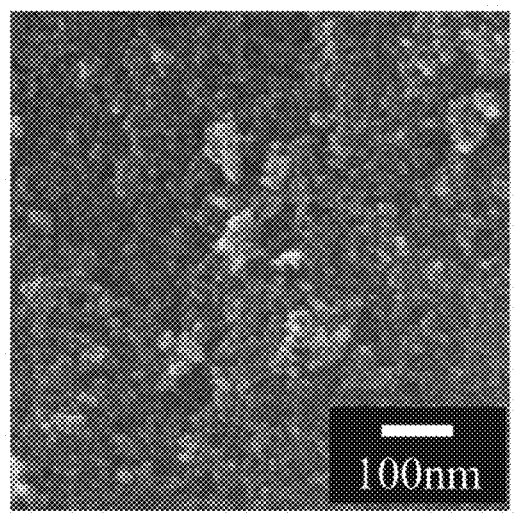
FIG. 3 is an electron micrograph of Sample C according to Example 3.
Figure 4:
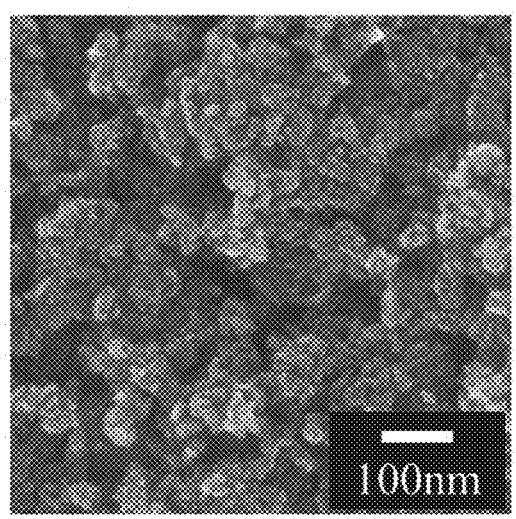
FIG. 4 is an electron micrograph of Sample D according to Example 4.
Figure 5:
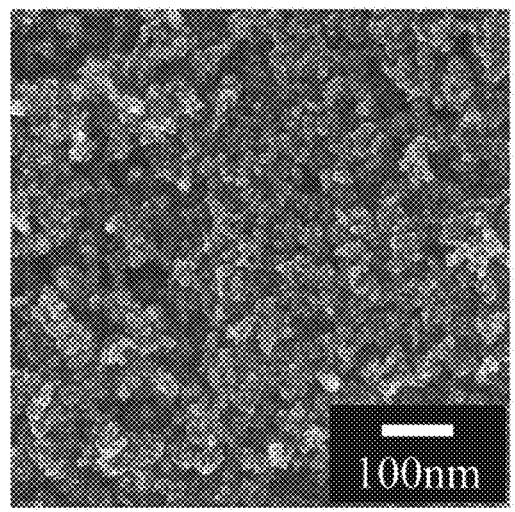
FIG. 5 is an electron micrograph of Sample E according to Example 5.
Figure 6:
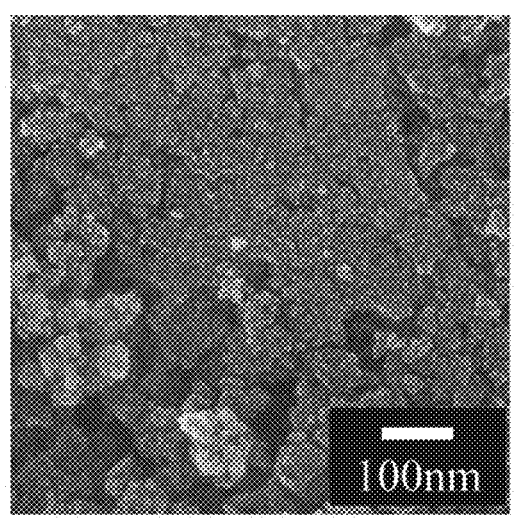
FIG. 6 is an electron micrograph of Sample F according to Example 6.
Figure 7:
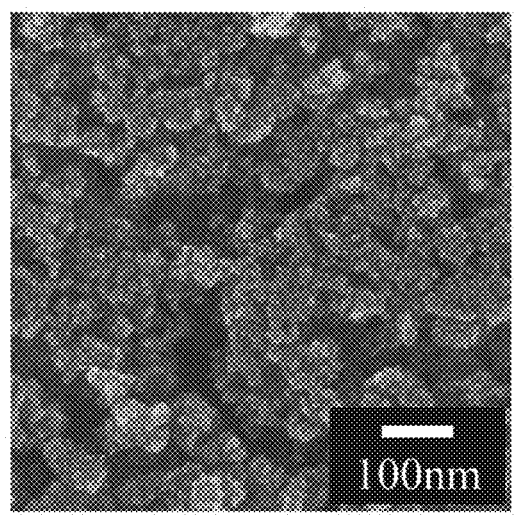
FIG. 7 is an electron micrograph of Sample G according to Example 7.
Figure 8:
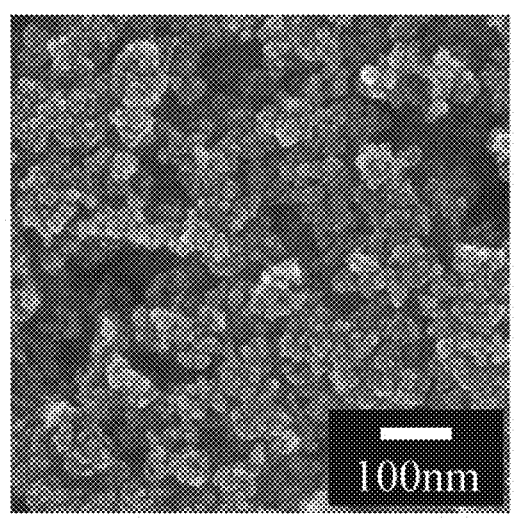
FIG. 8 is an electron micrograph of Sample H according to Example 8.
Figure 9:
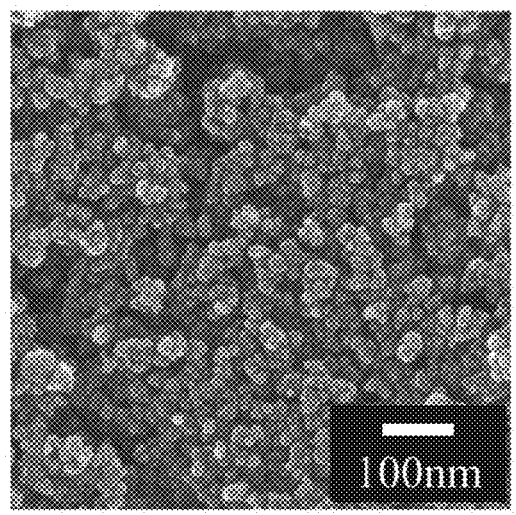
FIG. 9 is an electron micrograph of Sample I according to Example 9.
Figure 10:
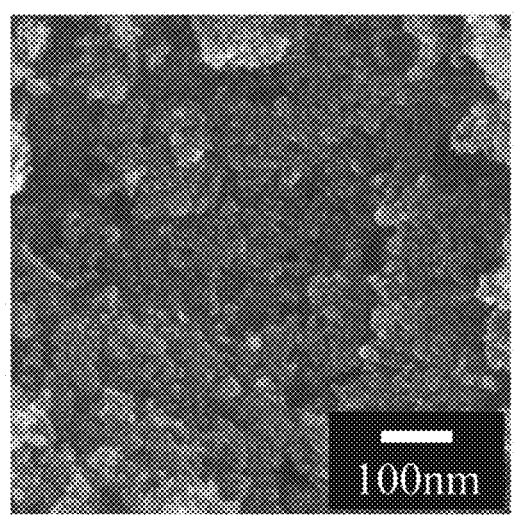
FIG. 10 is an electron micrograph of Sample K according to Example 11.
Figure 11:
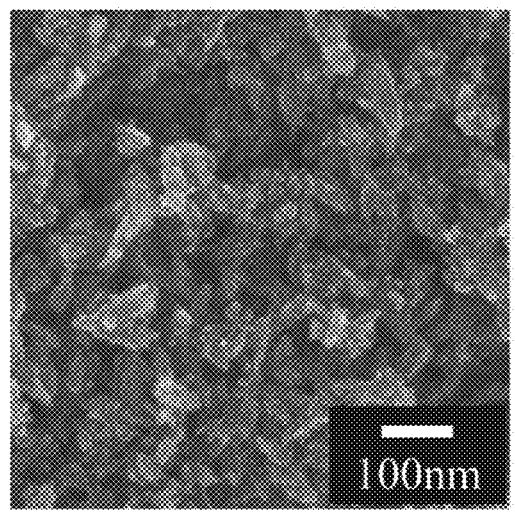
FIG. 11 is an electron micrograph of Sample L according to Example 12.
Figure 12:
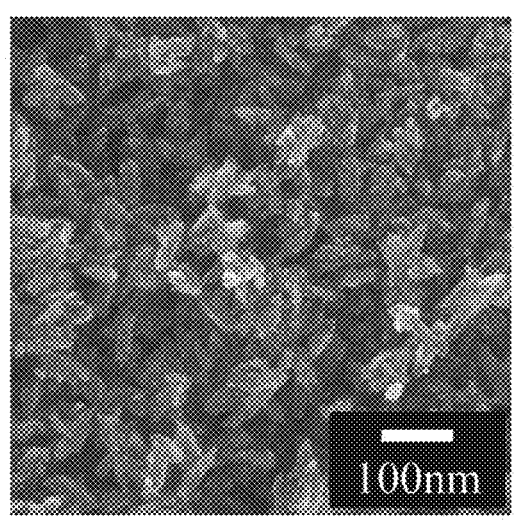
FIG. 12 is an electron micrograph of Sample M according to Example 13.
Figure 13:
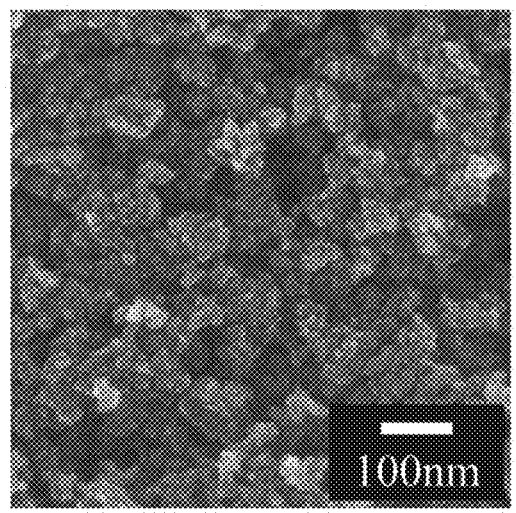
FIG. 13 is an electron micrograph of Sample N according to Example 14.
Figure 14:
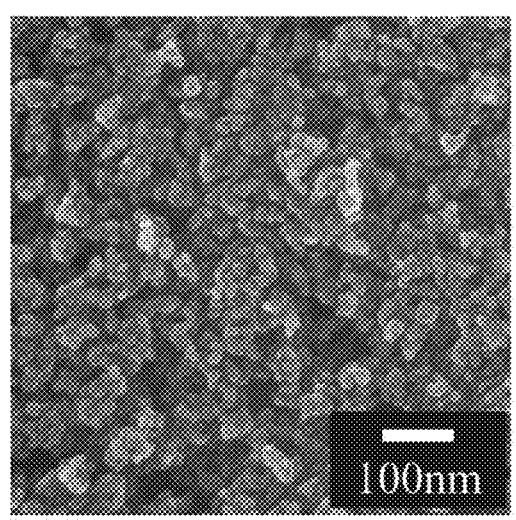
FIG. 14 is an electron micrograph of Sample O according to Example 15.
Figure 15:
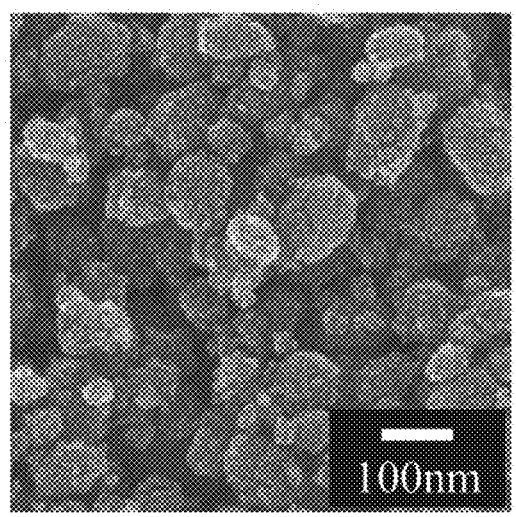
FIG. 15 is an electron micrograph of Sample P according to Example 16.
Figure 16:
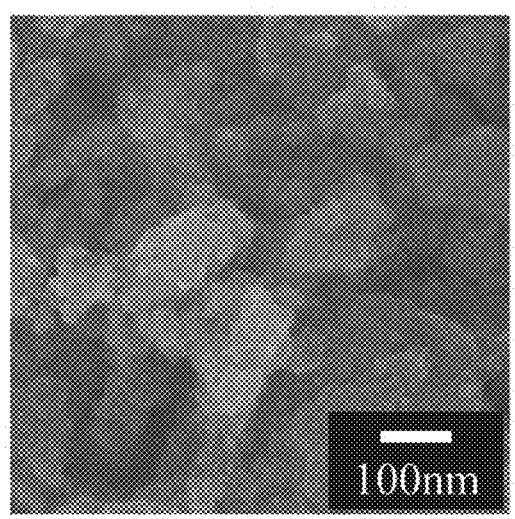
FIG. 16 is an electron micrograph of Sample Q according to Example 17.

The results of Evaluations 1 to 4 are shown in Table 1. The electron micrographs of Example Samples (A to I, K to Q) are also shown in FIGS. 1 to 16. Samples A to W produced in Examples 1 to 23 had a small primary particle diameter as well as a small agglomerated particle diameter, and thus the ratio therebetween (namely, the agglomerated particle diameter/the BET diameter) was small. Additionally, it has been found that the purity of $TiO_2$, which was 99.9% by mass or more, is sufficiently high and that the pore volume is relatively large. Impurities contained in the titanium oxide fine particles were measured by ICP analysis.

TABLE 1

| Sample | BET specific surface area (m²/g) | BET diameter (nm) | Crystal form | Pore volume (ml/g) | Agglomerated particle diameter (nm) | Agglomerated particle diameter/ BET diameter | Crystallite diameter (Å) A(101) | Crystallite diameter (Å) R(110) | Rutile % | Purity of $TiO_2$ (%) |
|---|---|---|---|---|---|---|---|---|---|---|
| A | 233 | 6 | A | | 117 | 19 | 50 | — | 0 | 99.99 |
| B | 56 | 25 | A/r | 0.29 | 102 | 4 | 163 | 170 | 8 | 99.99 |
| C | 345 | 4 | A | 0.41 | 112 | 27 | 57 | — | 0 | 99.99 |
| D | 207 | 7 | R/A | | 89 | 13 | 59 | 108 | 69 | 99.9 or more |
| E | 90 | 16 | R/A | 0.37 | 81 | 5 | 61 | 112 | 54 | 99.98 |
| F | 348 | 4 | A | 0.66 | 146 | 36 | 24 | — | 0 | 99.99 |
| G | 152 | 9 | A | 0.56 | 121 | 13 | 87 | — | 0 | 99.99 |
| H | 97 | 14 | A | 0.47 | 92 | 6 | 123 | — | 0 | 99.99 |
| I | 66 | 23 | A | 0.35 | 73 | 3 | 170 | — | 0 | 99.99 |
| J | 238 | 6 | Amorphous | | 174 | 29 | — | — | — | 99.9 or more |
| K | 210 | 7 | R/a | | 93 | 13 | 26 | 90 | 96 | 99.9 or more |
| L | 159 | 10 | R/a | | 70 | 7 | — | 67 | 99 | 99.9 or more |
| M | 160 | 10 | R | 0.66 | 68 | 7 | — | 69 | 100 | 99.9 or more |
| N | 222 | 6 | A | 0.56 | 83 | 13 | 63 | — | 0 | 99.99 |
| O | 82 | 17 | A/r | 0.54 | 65 | 4 | 135 | 202 | 2 | 99.9 or more |
| P | 212 | 7 | A | | 116 | 18 | 51 | — | 0 | 99.9 or more |
| Q | 282 | 5 | A/r | | 132 | 26 | 41 | 27 | 1 | 99.9 or more |
| R | 194 | 7 | A | | 172 | 24 | 54 | — | 0 | 99.9 or more |
| S | 266 | 5 | A/r | | | | | | | 99.9 or more |
| T | 265 | 5 | A | | | | | | | 99.9 or more |
| U | 196 | 7 | A/r | | | | | | | 99.9 or more |
| V | 250 | 6 | A/r | | | | | | | 99.9 or more |
| W | 298 | 5 | A/r | | | | | | | 99.9 or more |
| a | 317 | 4 | Amorphous | | 186 | 42 | — | — | — | 99.9 or more |
| b | 366 | 4 | Amorphous | | 189 | 48 | — | — | — | 99.9 or more |

Note)
In this table, "A" represents an anatase crystal, and "R" represents a rutile crystal. "A/r" indicates that the sample is anatase-rich. "R/A" indicates that anatase and rutile are comparable. "R/a" indicates that the sample is rutile-rich. Both contents of rutile and anatase are estimated from the rutile and anatase peaks of X-ray diffraction, respectively, and "Rutile %" is calculated by the following expression.
Rutile % = Rutile content/(Rutile content + Anatase content) * 100 Blanks indicate that the values are unmeasured, and "—" represents an immeasurable value.

Production of Lithium Titanate

The Li/Ti ratio was set to 0.81. And, a predetermined amount of $LiOH \cdot H_2O$ was weighed into an SUS container, was filled with pure water to provide the concentration of 4.5 mol/L, and thereby the aqueous solution was prepared. Thereafter, each powder of Samples A to W was added thereto so that the slurry solid content becomes 60 g/L, and this solution was stirred for about 30 minutes to disperse the powder. Subsequently, a spray dryer (manufactured by Yamato Scientific Co., Ltd.: nozzle type) was used to spray-dry the solution to yield a dry powder (spraying conditions: inlet temperature 190° C., outlet temperature 85° C., and air pressure 0.25 MPa).

A predetermined amount of the dry powder obtained was placed in a crucible and fired in a muffle furnace in the range of 400 to 600° C. The sample obtained was evaluated by X-ray diffraction, TG-DTA thermal analysis and the like. As a result, regarding each powder of Samples A to W, it has been found that phase change into $Li_4Ti_5O_{12}$ and crystallization starts in the relatively low temperature region and the reactivity with lithium is good.

Production of Barium Titanate 100 g of each titanium oxide fine particles powder of Samples A to W and one liter of ion exchange water were placed in a beaker to provide an aqueous suspension solution. Subsequently, this aqueous suspension solution and commercially available barium hydroxide ($Ba(OH)_2 \cdot 8H_2O$) (Ba/Ti molar ratio=1.5) was placed in a 3-liter autoclave and heated. The solution was maintained at a temperature of 150° C. for one hour to conduct hydrothermal treatment under a saturated steam pressure. Subsequently, the product obtained was filtered with a suction filter, washed, and dried at a temperature of 105° C. to thereby yield barium titanate powder.

Furthermore, 10 g of dried product obtained by the aforementioned method was fired at a temperature of 550° C. for one hour to yield each barium titanate powder.

The barium titanate sample obtained was evaluated by X-ray diffraction, TG-DTA thermal analysis and the like. As a result, it has been found that each sample is a compound having good crystallinity and a small primary particle diameter and the reactivity with barium is good.

INDUSTRIAL APPLICABILITY

The titanium oxide fine particles of the present invention, which are highly-pure titanium oxide, have a small degree of agglomeration, and thus have a good reactivity with barium, lithium and the like. Accordingly, the titanium oxide fine particles are suitable as raw materials for producing titanium composite oxides, catalyst carriers, catalysts, photocatalysts, or adsorbents.

The invention claimed is:

1. Titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g.

2. The titanium oxide fine particles according to claim 1, having an anatase and/or rutile crystal form.

3. The titanium oxide fine particles according to claim 1, wherein the BET diameter of the titanium oxide fine particles is determined by $d=6/(\rho \cdot a)$ using the specific surface area "a" ($m^2/g$) calculated by the nitrogen adsorption method (BET method), wherein d is the primary particle diameter (BET diameter) (μm), and ρ is the specific gravity of the titanium oxide ($g/cm^3$).

4. The titanium oxide fine particles according to claim 1, wherein the agglomerated particle diameter of the titanium oxide fine particles is determined as a particle size distribution of a water dispersion slurry of the titanium oxide fine particles measured with a laser diffraction/scattering particle size distribution analyzer.

5. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising mixing a titanium (oxy)chloride and an alkali into an aqueous solvent heated to a temperature of 50 to 110° C. to fall a pH of an aqueous solution prepared thereby within a range of 0 to 12, and thereby hydrolyzing the titanium(oxy)chloride.

6. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
adjusting a pH of an aqueous solution including titanium (oxy)chloride to a range of 1 or less;
subsequently heating the aqueous solution to a temperature of 50 to 110° C.; and
thereby hydrolyzing the titanium(oxy)chloride.

7. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
mixing an alkali into an aqueous solution including a titanium(oxy)chloride to fall a pH of the aqueous solution within a range of 0 to 9;
subsequently heating the aqueous solution to a temperature of 50 to 110° C.; and
thereby hydrolyzing the titanium(oxy)chloride.

8. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
a first step of mixing a titanium(oxy)chloride and an alkali into an aqueous solvent heated to a temperature of 50 to 110° C. to fall a pH of an aqueous solution prepared thereby within a range of 0 to 12, and thereby conducting a hydrolysis of the titanium(oxy)chloride as a first hydrolysis; and
a second step of subsequently mixing a titanium(oxy) chloride and an alkali into the aqueous solution which includes a product from the first hydrolysis and which is adjusted to a temperature of 50 to 110° C., to fall a pH of the aqueous solution within a range of 0 to 12, and thereby conducting a hydrolysis of the titanium (oxy)chloride present in the second step as a second hydrolysis.

9. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
 a first step of mixing a titanium(oxy)chloride and an alkali into an aqueous solvent heated to a temperature of 50 to 110° C. to fall a pH of an aqueous solution prepared thereby within a range of 0 to 12, and thereby conducting a hydrolysis of the titanium(oxy)chloride as a first hydrolysis; and
 a second step of subsequently mixing a titanium(oxy)chloride into the aqueous solution including a product from the first hydrolysis to adjust a pH of the aqueous solution to a range of 1 or less, followed by adjusting a temperature of the aqueous solution to a range of 50 to 110° C., and thereby conducting a hydrolysis of the titanium(oxy)chloride present in the second step as a second hydrolysis.

10. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
 a first step of mixing a titanium(oxy)chloride and an alkali into an aqueous solvent heated to a temperature of 50 to 110° C. to fall a pH of an aqueous solution prepared thereby within a range of 0 to 12, and thereby conducting a hydrolysis of the titanium(oxy)chloride as a first hydrolysis; and
 a second step of subsequently mixing a titanium(oxy)chloride into the aqueous solution including a product from the first hydrolysis and mixing an alkali into the aqueous solution to fall a pH of the aqueous solution within a range of 0 to 9, followed by adjusting a temperature of the aqueous solution to a range of 50 to 110° C., and thereby conducting a hydrolysis of the titanium(oxy)chloride present in the second step as a second hydrolysis.

11. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
 a first step of adjusting a pH of an aqueous solution including a titanium(oxy)chloride to a range of 1 or less, followed by heating the aqueous solution to a temperature of 50 to 110° C., and thereby conducting a hydrolysis of the titanium(oxy)chloride as a first hydrolysis; and
 a second step of subsequently mixing a titanium(oxy)chloride and an alkali into the aqueous solution which includes a product from the first hydrolysis and which is adjusted to a temperature of 50 to 110° C., to fall a pH of the aqueous solution within a range of 0 to 12, and thereby conducting a hydrolysis of the titanium(oxy)chloride present in the second step as a second hydrolysis.

12. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
 a first step of adjusting a pH of an aqueous solution including a titanium(oxy)chloride to a range of 1 or less, followed by heating the aqueous solution to a temperature of 50 to 110° C., and thereby conducting a hydrolysis of the titanium(oxy)chloride as a first hydrolysis; and
 a second step of subsequently mixing a titanium(oxy)chloride into the aqueous solution including a product from the first hydrolysis to adjust a pH of the aqueous solution to a range of 1 or less, followed by adjusting a temperature of the aqueous solution to a range of 50 to 110° C., and thereby conducting a hydrolysis of the titanium(oxy)chloride present in the second step as a second hydrolysis.

13. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
 a first step of adjusting a pH of an aqueous solution including a titanium(oxy)chloride to a range of 1 or less, followed by heating the aqueous solution to a temperature of 50 to 110° C., and thereby conducting a hydrolysis of the titanium(oxy)chloride as a first hydrolysis; and
 a second step of subsequently mixing a titanium(oxy)chloride into the aqueous solution including a product from the first hydrolysis and mixing an alkali into the aqueous solution to fall a pH of the aqueous solution within a range of 0 to 9, followed by adjusting a temperature of the aqueous solution to a range of 50 to 110° C., and thereby conducting a hydrolysis of the titanium(oxy)chloride present in the second step as a second hydrolysis.

14. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
- a first step of mixing an alkali into an aqueous solution including a titanium(oxy)chloride to fall a pH of the aqueous solution within a range of 0 to 9, followed by heating the aqueous solution to a temperature of 50 to 110° C., and thereby conducting a hydrolysis of the titanium(oxy)chloride as a first hydrolysis; and
- a second step of subsequently mixing a titanium(oxy) chloride and an alkali into the aqueous solution which includes a product from the first hydrolysis and which is adjusted to a temperature of 50 to 110° C., to fall a pH of the aqueous solution within a range of 0 to 12, and thereby conducting a hydrolysis of the titanium (oxy)chloride present in the second step as a second hydrolysis.

15. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
- a first step of mixing an alkali into an aqueous solution including a titanium(oxy)chloride to fall a pH of the aqueous solution within a range of 0 to 9, followed by heating the aqueous solution to a temperature of 50 to 110° C., and thereby conducting a hydrolysis of the titanium(oxy)chloride as a first hydrolysis; and
- a second step of subsequently mixing a titanium(oxy) chloride into an aqueous solution including a product from the first hydrolysis to adjust a pH of the aqueous solution to a range of 1 or less, followed by adjusting a temperature of the aqueous solution to a range of 50 to 110° C., and thereby conducting a hydrolysis of the titanium(oxy)chloride present in the second step as a second hydrolysis.

16. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
- a first step of mixing an alkali into an aqueous solution including a titanium(oxy)chloride to fall a pH of the aqueous solution within a range of 0 to 9, followed by heating the aqueous solution to a temperature of 50 to 110° C., and thereby conducting a hydrolysis of the titanium(oxy)chloride as a first hydrolysis; and
- a second step of subsequently mixing a titanium(oxy) chloride into the aqueous solution including a product from the first hydrolysis and mixing an alkali into the aqueous solution to fall a pH of the aqueous solution within a range of 0 to 9, followed by adjusting a temperature of the aqueous solution to a range of 50 to 110° C., and thereby conducting a hydrolysis of the titanium(oxy)chloride present in the second step as a second hydrolysis.

17. The method for producing titanium oxide fine particles according to claim 8, wherein a mass ratio of the product from the first hydrolysis to a product from the second hydrolysis is in a range between 3:97 and 70:30.

18. The method for producing titanium oxide fine particles according to claim 8, wherein the first hydrolysis and the second hydrolysis are conducted in one reaction vessel.

19. The method for producing titanium oxide fine particles according to claim 8, wherein a product from the second hydrolysis is deposited and grown on a particle surface of the product from the first hydrolysis.

20. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:
- adding an alkali or acid to an aqueous solution including the titanium oxide fine particles produced by the method according to any of claims 5 to 16 to adjust a pH of the aqueous solution to a range of 6.0 to 8.0; and
- subsequently conducting a filtration and drying of the aqueous solution.

21. A method for producing titanium oxide fine particle powder, comprising firing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g.

22. A composite oxide comprising a reaction product of titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g and at least one metal element except for titanium.

23. A method for producing titanium oxide fine particles having a BET diameter of 1 to 50 nm, an agglomerated particle diameter of 1 to 200 nm at 50% cumulative mass (D50) in a particle size distribution as diameter of an agglomerated particle formed in a water dispersion slurry by the titanium oxide fine particles, and a value of 5 to 40 as a ratio there between, namely, a ratio of the agglomerated particle diameter/the BET diameter, and a crystallite diameter from 20 to 250 Å, a purity of 99.9% or more, the titanium oxide fine particles comprising pores having a diameter of 1 to 100 nm, wherein the pores have a pore volume of 0.2 to 0.7 ml/g, comprising the steps of:

- a first step of mixing an alkali into an aqueous solution including a titanium(oxy)chloride to fall a pH of the aqueous solution within a range of 0 to 9, followed by heating the aqueous solution to a temperature of 50 to 110° C., and thereby conducting a hydrolysis of the titanium(oxy)chloride as a first hydrolysis; and
- a second step of subsequently mixing a titanium(oxy) chloride into the aqueous solution including a product from the first hydrolysis and adjusting a temperature of the aqueous solution to a range of 50 to 110° C., and mixing an alkali into the aqueous solution to fall a pH of the aqueous solution within a range of 0 to 9, and thereby conducting a hydrolysis of the titanium(oxy) chloride present in the second step as a second hydrolysis.

* * * * *